April 1, 1958 H. L. PHILIPPE Re. 24,449
HAND-OPERATED, PLIER-TYPE TUBE BENDER
Original Filed Dec. 30, 1955
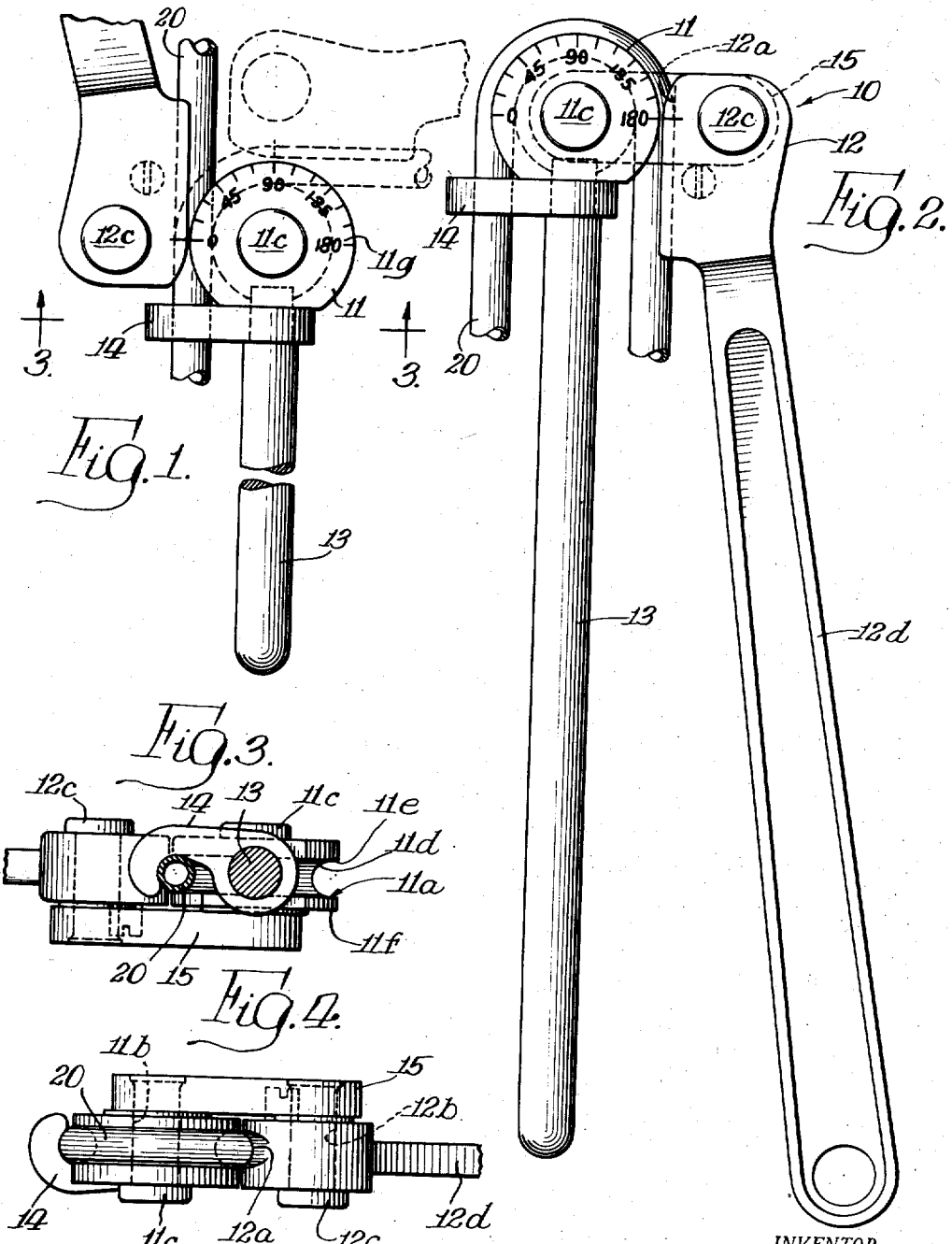
Fig. 1.
Fig. 2.
Fig. 3.
Fig. 4.
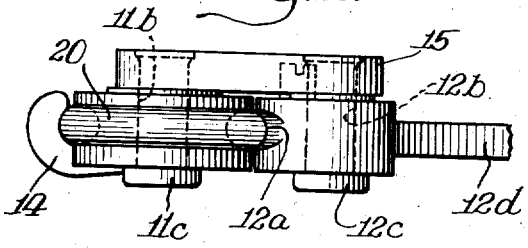
INVENTOR.
Howard L. Philippe
BY
Schwarcz, Hoffman,
Brady & Hoffman Attys.

United States Patent Office

Re. 24,449
Reissued Apr. 1, 1958

24,449

HAND-OPERATED, PLIER-TYPE TUBE BENDER

Howard L. Philippe, Chicago, Ill., assignor to The Imperial Brass Manufacturing Company, a corporation of Illinois Original No. 2,796,785, dated June 25, 1957, Serial No. 556,638, December 30, 1955. Application for reissue September 5, 1957, Serial No. 682,998

5 Claims. (Cl. 81—15)

Matter enclosed in heavy brackets [ ] appears in the original patent but forms no part of this reissue specification; matter printed in italics indicates the additions made by reissue.

This invention relates to a tube bender and in particular to a tube bender having new and improved means for preventing undesirable deformation of the tube and longitudinal movement of the tube through the bender during the bending process.

Various forms of tube benders are known in the art having a mandrel with a peripheral, tube receiving, arcuate groove and a shoe member pivotally carried by the mandrel for pressing the tube into the mandrel groove. It has been found, however, that the friction between the shoe and the tube during the bending process tends to move the tube longitudinally through the mandrel groove in the direction of movement of the shoe, with an imperfect bend resulting. To prevent such longitudinal movement, various forms of tube retaining members are used, for example, hooks and clamps which are secured in fixed relationship to the mandrel and arranged to engage the peripheral surface of the tubing adjacent the mandrel. Such members have the serious disadvantage of gouging the tube surface during use and/or requiring additional adjustment operations in making the bend.

It has also been found that the tube tends to be deformed during the bending operation by flattening or expanding laterally relative to the plane of the bend. Such deformation is very undesirable as it tends to weaken the tube and affects the cross sectional area of the flow passage.

A principal object of the applicant's invention is to provide a tube bender having new and improved means for effectively preventing longitudinal movement of the tube during the bending operation.

Another object is to provide a tube bender having new and improved means for preventing undesirable flattening deformation of the tube being bent.

Still another object is to provide a new and improved tube bender provided with a sliding shoe element having substantially less tube contacting area than the tube contacting area of the tube bender mandrel.

A further object of the invention is to provide such a tube bender having tube retaining walls extending outwardly from the mandrel groove to grip tightly the tube when it tends to expand laterally during the bending operation.

Yet another object is to provide a tube bender having a mandrel and a sliding shoe element with complementary tube receiving grooves therein and with the mandrel groove having a semicircular bottom and parallel, straight sides.

A still further object is to provide a tube bender having a shoe adapted to engage a radially outer periphery of the tube over less than 180° extent to concentrate the stretching forces produced on the portion of the tube

[having the greatest forces produced on the portion of the tube] having the greatest stresses produced therein during the bending operation.

Other features and advantages of this invention will be apparent from the following description taken in connection with the accompanying drawings, wherein:

Figure 1 is a fragmentary elevational view of a tube bender embodying the invention;

Figure 2 is an elevational view thereof with the parts thereof in a position assumed upon completion of a tube bend;

Figure 3 is a sectional view, taken approximately along the line 3—3 of Figure 1; and Figure 4 is an end view of the tube bender with the parts in the position of Figure 2.

In the exemplary embodiment of the invention as disclosed in the drawings, the tube bender generally designated 10 may be seen to comprise a mandrel 11 having a shoe element 12 pivotally secured thereto and adapted to move around the periphery of the mandrel. A handle 13 is fixedly secured to the mandrel and a hook 14 is pivotally mounted on the handle adjacent the mandrel for engaging a portion of the tube 20 to be bent for preventing lateral movement of the free end of the tube 20 away from handle 13 during the bending operation.

A new and improved tube receiving groove structure is provided in the periphery of the mandrel 11 and in the face of shoe 12 comprising a recessed groove 11a in the mandrel 11 and a shallow groove 12a in the shoe 12. As will be brought out more clearly here following, groove 11a acts effectively to prevent longitudinal movement of tube 20 during the bending operation and the configuration of shallow groove 12a effectively minimizes frictional forces tending to move tube 20 longitudinally during the bending operation while providing an improved tube bending coaction.

Mandrel 11 comprises a generally cylindrical member having a bore 11b in which is freely pivotally carried a headed pin 11c. Shoe 12 is similarly provided with a bore 12b which carries a headed pin 12c. Extending between pins 11c and 12c is a link 15 which is adapted to allow movement of shoe 12 around the periphery of mandrel 11 with grooves 11a and 12a in complementary juxtaposed relationship. Pins 11c and 12c are swaged outwardly of link 15 to retain the mandrel and shoe elements in assembled relationship. Extending from shoe 12 is a lever arm 12d permitting manual operation of the shoe.

As best seen in Figures 3 and 4, mandrel groove 11a, in cross section, is generally U-shaped having a semicircular inner surface 11d and parallel, planar outer surfaces 11e. Such structure effectively constitutes a recessed, semi-cylindrical, annular groove having parallel annular surfaces 11e extending outwardly therefrom tangential to the semi-cylindrical groove at the terminal edges thereof. Shoe groove 12a is made generally complementary to the mandrel groove and extends substantially less than 180° but sufficiently to engage the greater portion of tube 20 extending from mandrel groove 11a.

In utilizing my tube bender, a tube 20 is inserted into grooves 11a and 12a with shoe 12 positioned as seen in Figure 1. Hook 14 is pivoted (to the left as seen in Figure 1) to engage the outer surface of tube 20 and prevent movement of the tube away from handle 13. Shoe 12 is then moved around the periphery of mandrel 11 through manual operation of lever arm 12d, while mandrel 11 is fixedly positoned by holding handle 13, until the desired bend in tube 20 is obtained. To assist in ascertaining the extent of any bend formed, mandrel 11 may be provided with a scale 11g showing the angular disposition of the portions of the periphery thereof.

The bending forces exerted on tube 20 by shoe 12 cause the tube to tend to expand laterally in mandrel groove 11a. However, flange surfaces 11e of the mandrel groove resist this lateral urging resulting in the tube being forced into tight holding engagement therewith. Thus, undesirable flattening deformation of the tube and longitudinal movement of tube 20 through groove 11a during the bending operation are prevented without the need of additional tube constraining means. It should be noted, at this point, that the functioning of my groove structure is antithetical to that of the conventional, solely semi-circular groove structure. In my device lateral expansion is constrained so as to hold the tube firmly in the groove, whereas in the conventional devices lateral expansion is not so checked and actually tends to draw the tube laterally from the groove (as the tube flattens its cross section changes from circular to somewhat elliptical and thus the half of its minor axis extending toward the groove bottom becomes less than the radius of the groove, thus effecting a spacing of the tube from the groove surface).

As shallow groove 12a of shoe 12 provides a reduced area of sliding contact with tube 20, the frictional forces produced by the action of the shoe against the tube are correspondingly reduced, thus effectively minimizing the tendency of the shoe to move the tube longitudinally during the bending operation. Further, as the force of bending is applied primarily to the radially outer portion of the periphery of the tube 20 where the greatest internal stresses are normally produced during the bending operation, the stretching effect of the movement of shoe 12 against tube 20 is concentrated where most desired rather than spread over the entire outer, semi-cylindrical surface of the tube as is done with shoes having grooves of 180° extent.

To remove the bent tube 20 from the tube bender 10, shoe 12 is pivoted to space groove 12a away from groove 11a and hook 14 pivoted to lose engagement with the outer surface of tube 20, allowing the bent tube to be withdrawn forcibly from its gripped retention in mandrel groove 11a.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A tube bender, of the character described, comprising: a rigid mandrel provided with an annular, peripheral groove having a U-shaped *transverse* cross [sectional configuration] *section substantially the entire length thereof*; a bending shoe carried by the mandrel to move in juxtaposition to the mandrel periphery and having *a* [an annular] groove *arcuate in cross-section and* of less than 180° extent, said grooves having complementary tube receiving relationship; means for preventing lateral movement of one portion of a tube in said grooves; means for holding said mandrel; and means for moving said shoe.

2. A tube bender, of the character described, comprising: a rigid mandrel provided with an annular, peripheral groove, *substantially the entire length thereof being* adapted to contact *the surface of* a tube over more than 180° *as measured around the tube axis* [of the surface thereof]; a bending shoe carried by the mandrel to move in juxtaposition to the mandrel periphery and having *a* [an annular] groove *arcuate in cross-section and* adapted to contact less than 180° of the tube surface, said grooves having complementary tube receiving relationship; means for preventing movement of a tube laterally from said grooves; means for holding said mandrel; and means for moving said shoe.

3. A tube bender, of the character described, comprising: a mandrel provided with an annular, peripheral groove having *over a substantial portion of the length thereof, including a portion intermediate the ends thereof,* a *transverse* cross-section consisting of a semicircular inner portion and a rectangular, radially extending outer portion; a bending shoe carried by the mandrel to move in juxtaposition to the mandrel periphery and having *a* [an arcuate, annular] groove *arcuate in cross-section and* of less than 180° extent, said grooves having complementary tube receiving relationship; and means for preventing lateral movement of one portion of a tube in said grooves.

4. A tube bender of the character described, comprising: a rigid mandrel *provided with* [having] a peripheral [, U-shaped] groove *having a* U-*shaped transverse cross-section throughout a major portion of the length thereof,* a handle fixedly secured to said mandrel and having a hook movably mounted thereon for holding a tube to be bent against movement away from said handle; a bending shoe having a shallow groove and a lever arm for manually operating said shoe; and link means for pivotally connecting said shoe to said mandrel with said grooves being positioned to form a tube receiving groove structure and allowing said shoe to be moved around the periphery of said mandrel to bend a tube therein.

5. In a tube bender of the character described, coacting mandrel and shoe elements, said elements defining cooperatively a tube receiving groove having a *transverse* cross-section characterized by an arcuate inner portion, an arcuate outer portion, and a straight, parallel sided intermediate portion, *said inner and intermediate portions having said cross-section throughout a major portion of the length of the groove.*

References Cited in the file of this patent or the original patent

UNITED STATES PATENTS

| | | |
|---|---|---|
| 2,127,185 | Parker | Aug. 16, 1938 |
| 2,171,907 | Beehler et al. | Sept. 5, 1939 |
| 2,428,237 | McIntosh | Sept. 30, 1947 |
| 2,464,800 | Franck | Mar. 22, 1949 |
| 2,757,562 | Zales et al. | Aug. 7, 1956 |

FOREIGN PATENTS

| | | |
|---|---|---|
| 417,656 | Great Britain | Oct. 3, 1934 |
| 464,413 | Canada | Apr. 18, 1950 |